F. W. BROOKS.

Seals for Locks.

No. 5,765. Reissued Feb. 17, 1874.

WITNESSES

Jas. L. Ewin

Walter Allen

INVENTOR

Franklin W. Brooks

By Knight Bros Attorneys

THE NORRIS PETERS CO., WASHINGTON, D. C.

UNITED STATES PATENT OFFICE.

FRANKLIN W. BROOKS, OF NEW YORK, N. Y., ASSIGNOR TO EDWARD J. BROOKS, OF SAME PLACE.

IMPROVEMENT IN SEALS FOR LOCKS.

Specification forming part of Letters Patent No. 141,110, dated July 22, 1873; reissue No. 5,765, dated February 17, 1874; application filed January 23, 1874.

*To all whom it may concern:*

Be it known that I, FRANKLIN W. BROOKS, of the city, county, and State of New York, have invented certain Improvements in Seals for Locks, of which the following is a specification:

The invention consists, first, in making a compound seal, consisting of a body of rigid frangible material and a surface of paper or other fibrous material adapted to be printed or written on, the paper being cemented or otherwise connected to the frangible body, so that the breaking of the latter will destroy the entire seal. This invention consists, further, in producing seals for locks by the combination of a transparent material, such as glass, and a thin fibrous material, such as paper, the paper having numbers, names, initials, or any private or other marks printed or otherwise placed upon it, and being applied behind or beneath the glass, the latter serving to protect the paper seal, and having to be broken before the seal can be removed or access had to the lock.

In the accompanying drawing are seven perspective views.

Figure 1 is intended to represent a seal of glass, having on its front surface colored characters formed in relief. These characters are indicated by the light letters and numerals, and may be produced by etching down the glass from a surface of the required color—red, for example—the desired marks being first made on the surface with a varnish which will resist the acid. The black marks in same figure are intended to be in *intaglio*, being produced by the application to the back of the glass of a suitable pigment adapted to fuse at about the same temperature as glass, or a little lower, and may be of suitable material to form a flux, which is then burned into the substance of the glass.

In using my invention, the paper seal, bearing any desired private or other marks, may, if preferred, be kept apart from the glass until about to be applied to the lock. It may be marked, when about to be used, as an additional means of security. It is cemented to the surface of the frangible body, and the compound seal is applied to a seal-lock adapted to receive it. Various modes of constructing such locks being well known, I deem any specific description of a lock unnecessary.

When the lock is to be opened, the glass is broken, and this destroys the paper seal which is securely cemented to it.

Figure 1:
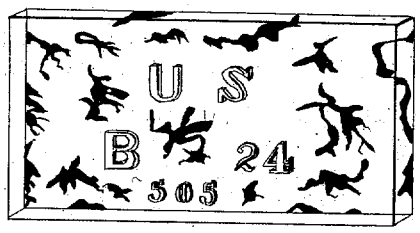
Figure 2:
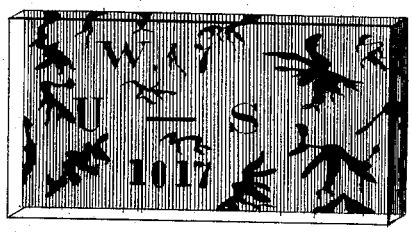
Fig. 2 is intended to represent the letters and numerals formed in relief, preferably in color, on the back of the glass, and the *intaglio* black marks burned into the back of the glass, as before.
Figure 3:
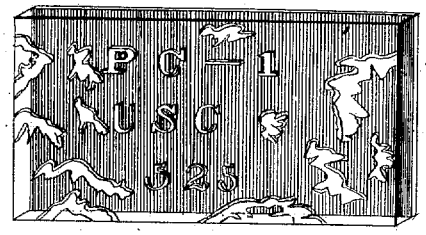
Fig. 3 shows both the letters and numerals and irregular marks applied in relief to the front surface, a piece of plain paper being cemented to the back of the glass for the reception of a signature or other distinguishing marks.
Figure 4:
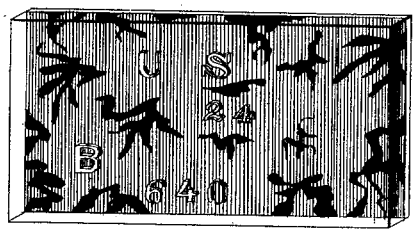
Fig. 4 is similar to the illustration given in Fig. 1, with paper seal cemented to the back.
Figure 5:
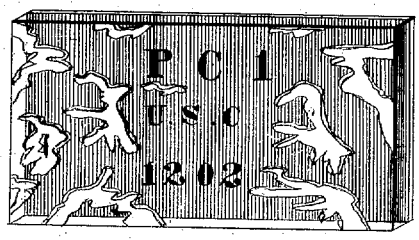
Fig. 5 represents irregular marks, preferably colored, produced in relief on the front surface, and printed marks on the paper seal, which is cemented to the back.
Figure 6:
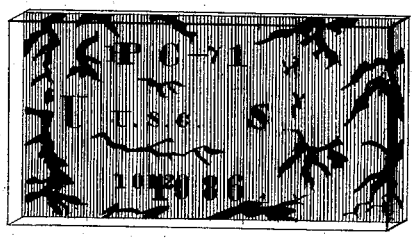
Fig. 6 is intended to represent letters and numerals in relief, and irregular marks in *intaglio* in the glass, on either or both surfaces, and a printed paper seal cemented to the back.
Figure 7:
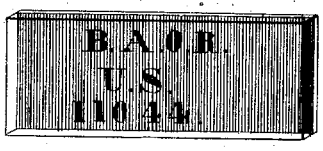
Fig. 7 shows a printed paper seal cemented to the back of a seal of plain glass.

The glass seals represented in Figs. 1 to 6, inclusive, are supplied at wholesale by the manufacturer to the government agents, railway or express companies, or other consumers, ready for use.

If the paper seal is not united with the glass until it is to be applied to the lock, the variegated or other distinguishing marks on both glass and paper produce combinations which cannot be known or ascertained until the parts are put together, and the combined seal applied by the duly authorized party.

The use of two colors in the glass, or in the combined seal, prevents counterfeiting the same by photography; but the characters and marks may be copied by photography to keep a record of them, suitable notes of the colors being made.

The paper cemented to the back of a seal of glass or other transparent material affords a surface on which the user may place his signature or other private mark with a pen.

I am aware that it is common to write on seals of paper, parchment, and like material; but I am not aware that a transparent or semi-transparent or a frangible body or seal has before been combined with a seal adapted to be written upon, either before or after its application to the frangible body.

The following is claimed as new:

1. A compound seal, made of rigid frangible material and paper or other fibrous material, in combination substantially as set forth.

2. The combination of a transparent or semi-transparent seal with a paper seal, so arranged that the said transparent seal, forming a part of the compound seal, must be broken to permit access to the lock, substantially as set forth.

In testimony of which invention I hereunto set my hand this 10th day of January, 1874.

FRANKLIN W. BROOKS.

Witnesses:
OCTAVIUS KNIGHT,
WALTER ALLEN.